United States Patent [19]
Torii

[11] Patent Number: 5,202,565
[45] Date of Patent: Apr. 13, 1993

[54] RADIATION IMAGE INFORMATION RECORDING AND READING APPARATUS

[75] Inventor: Shumpeita Torii, Kanagawa, Japan

[73] Assignee: Fuji Photo Film Co., Ltd., Kanagawa, Japan

[21] Appl. No.: 870,304

[22] Filed: Apr. 17, 1992

[30] Foreign Application Priority Data

Apr. 19, 1991 [JP] Japan ................... 3-088598

[51] Int. Cl.⁵ ............................................ G03B 42/02
[52] U.S. Cl. ................................. 250/327.2; 378/209
[58] Field of Search .................. 250/327.2 B, 327.2 J; 378/208, 209, 177

[56] References Cited

U.S. PATENT DOCUMENTS

| 4,400,619 | 8/1983 | Kotera et al. | |
| 4,543,479 | 9/1985 | Kato | |
| 4,760,265 | 7/1988 | Yoshida et al. | 378/208 |
| 4,771,174 | 9/1988 | Torii | |
| 4,851,679 | 7/1989 | Tamura et al. | |
| 4,982,419 | 1/1991 | Horikawa | 378/155 |

FOREIGN PATENT DOCUMENTS

| 56-11392 | 2/1981 | Japan |
| 56-12599 | 2/1981 | Japan |
| 59-192240 | 10/1984 | Japan |
| 60-256134 | 12/1985 | Japan |
| 64-82029 | 3/1989 | Japan |

Primary Examiner—Paul M. Dzierzynski
Assistant Examiner—Richard Hanig
Attorney, Agent, or Firm—Sughrue, Mion, Zinn, Macpeak & Seas

[57] ABSTRACT

Disclosed herein is a radiation image information recording and reading apparatus which basically comprises first and second recording units, a reading unit, an erasing unit and a feed system. In the apparatus, either one of the first and second recording units is first selected. Then, an object set on the selected recording unit is irradiated with radiation emitted from a radiation source to produce a radiation-transmitted image, which is in turn recorded on a stimulable phosphor sheet. The stimulable phosphor sheet is illuminated with stimulating rays to emit accelerated light therefrom. Thereafter, the produced light is photoelectrically read to produce an image signal corresponding to the radiation-transmitted image. Thus, the radiation photography of an object can easily be made by selecting either one of the first and second recording units according to parts of the object to be radiographed. Therefore, a reduction in the cost borne by a user can easily be achieved and an increase in space for the apparatus to be installed can be avoided.

10 Claims, 4 Drawing Sheets

RADIATION IMAGE INFORMATION RECORDING AND READING APPARATUS

BACKGROUND OF THE INVENTION

1. Field of the Invention

The present invention relates to a radiation image information recording and reading apparatus having two recording units, which records radiation-transmitted image of an object placed on one selected from the two recording units on a stimulable phosphor sheet as radiation image information and reads the radiation image information from the sheet so as to produce an image signal.

2. Description of the Related Art

There has recently been proposed a radiation image information recording and reading apparatus of a type wherein radiation image information of an object such as a human body is first stored and recorded on a stimulable phosphor sheet using a stimulable phosphor and the stimulable phosphor sheet is then scanned with stimulating rays to emit accelerated light therefrom, thereby photoelectrically detecting the emitted light so as to produce an image information signal. When the image information signal produced by the apparatus is electrically processed to generate a radiation image of the object appropriate to the diagnosis, a final image may be reproduced as a hard copy or may be reproduced as a visible image on a CRT.

In the radiation image information recording and reading apparatus referred to above, it is unnecessary to semipermanently record the radiation image information on the stimulable phosphor sheet. The stimulable phosphor sheet is used to temporarily bear image information thereon with a view toward recording an image on the above final recording medium. Therefore, stimulable phosphor sheet may be repeatedly be used, and hence the repetitive use of the stimulable phosphor sheet can provide considerable economy. Incidentally, the reuse of the stimulable phosphor sheet is made in the following manner. That is, the energy of radiation, which remains on the stimulable phosphor sheet from which the accelerated light has already been read, is discharged or radiated by a method described in U.S. Pat. No. 4,400,619 and Japanese Patent Application Laid-Open No. 56-12599 for example so as to erase the remaining or residual radiation image information from the sheet. Thereafter, such a stimulable phosphor sheet may be used again for the recording of the radiation image information thereon.

From the above standpoint, there has been proposed a radiation image information recording and reading apparatus comprising a recording unit for recording radiation image information of an object on a stimulable phosphor sheet, a reading unit for reading the radiation image information stored and recorded on the stimulable phosphor sheet, and an erasing unit for radiating the radiation energy remaining on the sheet from which the radiation image information has already been read (see Japanese Patent Application Laid-Open No. 60-256134 and U.S. Pat. No. 4,851,679).

In this type of apparatus, an object is normally placed on a movable exposure or radiation-photography table in a recumbent state and the table is then moved to set a part of the object to be radiographed to the most suitable position, followed by making of radiographs of the affected parts of the head, chest, abdomen, etc. of the object. In this case, radiation emitted from a radiation source passes through the object, the table and a scattered-radiation removing grid so as to reach a stimulable phosphor sheet. Thus, the radiation is absorbed by the table and the scattered-radiation removing grid and hence the radiation dose is reduced correspondingly, thereby developing inconvenience such as deterioration in the quality of an image. Therefore, the radiation photography of the object is made while the dose of the radiation emitted from the radiation source is being increased.

On the other hand, when it is desired to make radiographs of the bones of the object's limbs, i.e., human hand and feet, for example, the area of the object to be radiographed is relatively narrow and the object is relatively thin in cross-section. It is therefore unnecessary to use the movable radiation-photography table and the scattered-radiation removing grid. Accordingly, the radiation photography of the object is normally made by a radiation image information recording and reading apparatus using a cassette with a stimulable phosphor sheet stored therein.

In the conventional method, one of radiation image information recording and reading apparatuses should be selected according to the parts of the object to be radiographed and the respective apparatuses should separately be provided. Therefore, a problem in space for each of the apparatuses to be installed as well as a problem in cost takes place. In general, a single radiation image information recording and reading apparatus constructed in such a manner that the movable radiation-photography table and the scattered-radiation removing grid can be loaded and unloaded in and from the apparatus cannot provide suitable radiation photography associated with various parts of an object to be subjected to radiation photography.

SUMMARY OF THE INVENTION

It is a general object of the present invention to provide a radiation image information recording and reading apparatus having two recording units, which is capable of suitably carrying out radiation photography corresponding to a part of an object to be radiographed by selectively using the recording units.

It is a principal object of the present invention to provide a radiation image information recording and reading apparatus capable of providing a reduction in the cost of the apparatus borne by a user.

It is another object of the present invention to provide a radiation image information recording and reading apparatus which can provide a reduction in space therefor to be installed and hence permits effective use of the space.

It is a further object of the present invention to provide a radiation image information recording and reading apparatus comprising first recording means for storing and recording radiation image information of an object on a stimulable phosphor sheet disposed via a scattered-radiation removing grid, second recording means placed side by side with the first recording means, for recording radiation image information of an object on a stimulable phosphor sheet, reading means for reading accelerated light obtained by irradiating the stimulable phosphor sheet with stimulating rays and generating an image signal corresponding to the radiation image information of the object from the read accelerated light, erasing means for radiating the energy of the remaining radiation from the stimulable phosphor sheet from which the radiation image information has been read, and a feed system for cyclically feeding the stimulable phosphor sheet among the first and second recording means, the reading means and the erasing means.

It is a still further object of the present invention to provide a radiation image information recording and reading apparatus wherein the first recording means is provided so as to extend along a lower surface of a radiation-photography table for supporting the object thereon in a recumbent state.

It is a still further object of the present invention to provide a radiation image information recording and reading apparatus wherein the second recording means is provided along an imaginary extension line of a feed path of the first recording means.

It is a still further object of the present invention to provide a radiation image information recording and reading apparatus wherein the second recording means is mounted on a radiation-photography table which projects from one of both side portions of the first recording means.

It is a still further object of the present invention to provide a radiation image information recording and reading apparatus wherein the second recording means is detachably mounted on said one side portion of the first recording means.

It is a still further object of the present invention to provide a radiation image information recording and reading apparatus wherein the second recording means has feed means for conveying the stimulable phosphor sheet from one to another between the first recording means and the second recording means.

It is a still further object of the present invention to provide a radiation image information recording and reading apparatus wherein light-screening means opened and closed according to the loading of the second recording means in said one side portion and unloading of the same therefrom is disposed between the first recording means and the second recording means.

It is a still further object of the present invention to provide a radiation image information recording and reading apparatus wherein transmitting means for connecting a feed system in the first recording means to the feed means of the second recording means thereby to transmit a driving force of the feed system to the feed means is disposed between the first recording means and the second recording means.

It is a still further object of the present invention to provide a radiation image information recording and reading apparatus wherein the reading means includes laser scanning means for scanning the stimulable phosphor sheet with a laser beam and photoelectric transducing means for converting accelerated light emitted from the stimulable phosphor sheet into an electric signal.

It is a still further object of the present invention to provide a radiation image information recording and reading apparatus wherein the erasing means has an erasing light source for irradiating the stimulable phosphor sheet with erasing light.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
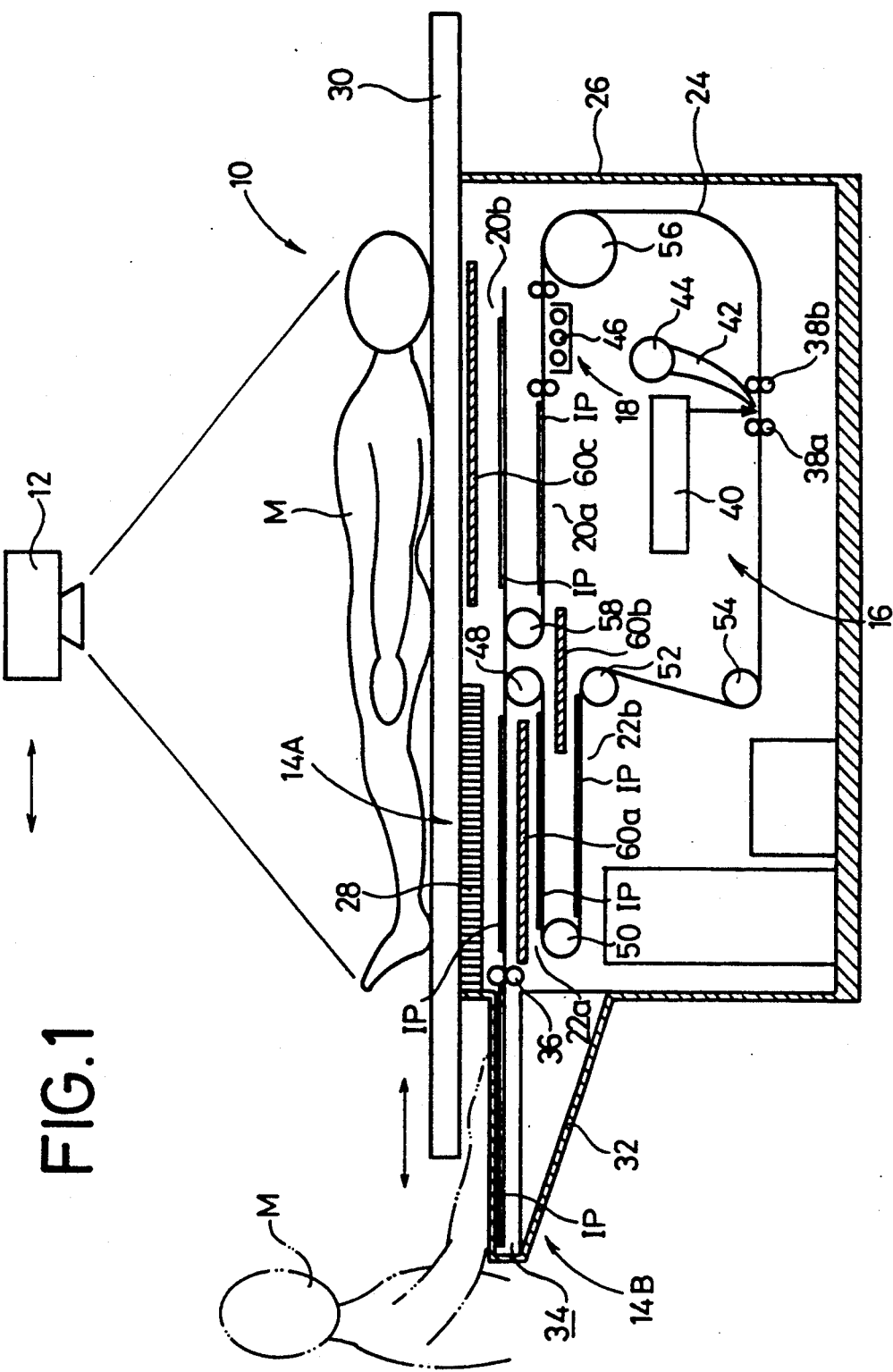
FIG. 1 is a cross-sectional view showing a radiation image information recording and reading apparatus according to one embodiment of the present invention.

In FIG. 1, reference numeral 10 indicates a radiation image information recording and reading apparatus according to one embodiment of the present invention. The radiation image information recording and reading apparatus 10 comprises first and second recording units 14A, 14B each used to store and record a radiation-transmitted image of an object M irradiated with radiation emitted from a radiation source 12 on a stimulable phosphor sheet IP, a reading unit 16 for photoelectrically reading accelerated light produced by exposing the stimulable phosphor sheet IP with the radiation-transmitted image recorded thereon to exciter or stimulating rays so as to generate an image signal corresponding to the radiation-transmitted image, an erasing unit 18 for discharging or radiating the energy of radiation which remains on the stimulable phosphor sheet IP subjected to the image reading from the sheet IP, radiation-photography stand-by units 20a, 20b each used to temporarily place an unexposed stimulable phosphor sheet IP on a waiting state between the erasing unit 18 and the first and second recording units 14A, 14B, reading stand-by units 22a, 22b each used to temporarily place an exposed stimulable phosphor sheet IP on a waiting state between the first and second recording units 14A, 14B and the reading unit 16, and a feed system 24 for connecting the first and second recording units 14A, 14B, the reading stand-by units 22a, 22b, the reading unit 16, the erasing unit 18 and the radiation-photography stand-by units 20a, 20b to one another. Incidentally, these components are enclosed with a casing 26.

As shown in FIG. 1, the first recording unit 14A is disposed in a left-hand position as seen in the upper surface of the casing 26. A scattered-radiation removing grid 28 is disposed in the casing 26 as seen in the left-hand position. An exposure or radiation-photography table 30 capable of supinely placing the object M thereon and moving it in the direction indicated by the arrow is mounted on the scattered-radiation removing grid 28. Incidentally, the first recording unit 14A principally makes radiation photography of thick-sectional parts, i.e., the head, chest, abdomen, etc. of the object M.

Figure 2:
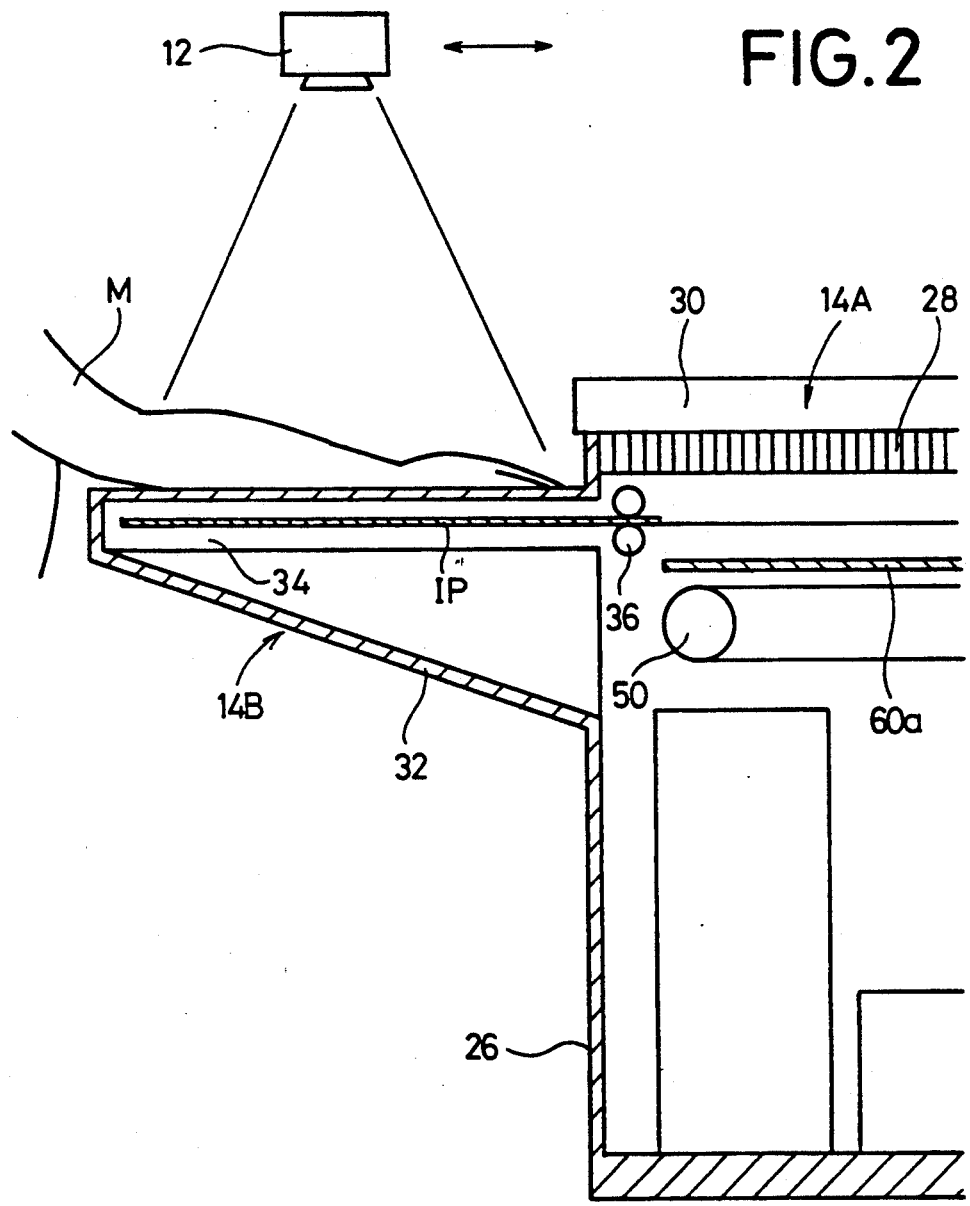
FIG. 2 is a cross-sectional view illustrating the structure of a second recording unit of the apparatus shown in FIG. 1.

The second recording unit 14B is mounted on one of both side portions of the casing 26, and has a radiation-photography table 32 disposed in a position adjacent to the first recording unit 14A. As illustrated in FIG. 2, the radiation-photography table 32 has a holding unit 34 for accommodating a stimulable phosphor sheet IP therein, which communicates with the first recording unit 14A. A pair of nip rollers 36 for causing the stimulable phosphor sheet IP to be accomodated in the holding unit 34 or taking out the accommodated stimulable phosphor sheet IP from the holding unit 34 so as to be fed toward the first recording unit 14A, is disposed between the holding unit 34 and the first recording unit 14A. The second recording unit 14B mainly makes radiation photography of the bones of the limbs as thin-sectional parts, i.e., the hand and legs of the object M placed on the radiation-photography table 32.

The reading unit 16 has an optical unit 40 for irradiating the stimulable phosphor sheet IP interposed between respective pairs of nip rollers 38a, 38b with a laser beam L as scanning light, and a photomultiplier 44 for applying the laser beam L to the stimulable phosphor sheet IP so as to photoelectrically read radiation image information stored and recorded thereon as accelerated light through an optical guide 42.

The erasing unit 18 has an erasing light source 46 such as a halogen lamp, for erasing the radiation energy which remains on the stimulable phosphor sheet IP by erasing light emitted from the erasing light source 46.

In the feed system 24, the stimulable phosphor sheet IP is bent twice 180° by 180° as seen from the first recording unit 14A side by rollers 48, 50 disposed in both ends of the first recording unit 14A, followed by transfer to the reading unit 16 via rollers 52, 54. The reading stand-by units 22a and 22b are disposed between the rollers 48 and 50 and between the rollers 50 and 52 respectively. Then, the stimulable phosphor sheet IP is bent in an upward direction and thereafter bent through 90° by a roller 56 so as to reach the erasing unit 18. Further, the stimulable phosphor sheet IP is bent through 180° by a roller 58 so as to reach the upper portion of the casing 26 as seen in the right direction in FIG. 1. In this case, the radiation-photography stand-by unit 20a is disposed between the erasing unit 18 and the roller 58, whereas the radiation-photography stand-by unit 20b is disposed in the upper portion of the casing 26. Incidentally, radiation intransmissive or screening plates 60a through 60c are disposed above the reading stand-by unit 22a, below the rollers 48, 58 and above the radiation-photography stand-by unit 20b respectively.

Then, the operation of the radiation image information recording and reading apparatus 10 constructed as described above will be described below.

A description will first be made of an exposure or radiation-photographing process of the first recording unit 14A.

As shown in FIG. 1, the object M is caused to lie down on the radiation-photography table 30 disposed on the first recording unit 14A, and the radiation source 12 is disposed above the object M. Then, the radiation-photography table 30 is moved in the direction indicated by the arrow so as to place a part of the object M to be radiographed in a given position on the first recording unit 14A. Thereafter, the feed system 24 is driven to place a stimulable phosphor sheet IP located in the radiation-photography stand-by unit 20b in a position below the scattered-radiation removing grid 28.

In this condition, the object M is irradiated with the radiation emitted from the radiation source 12 to produce a radiation-transmitted image. The radiation-transmitted image thus produced is then stored and recorded on the stimulable phosphor sheet IP through the scattered-radiation removing grid 28. The stimulable phosphor sheet IP with the radiation-transmitted image recorded thereon is fed to the reading unit 16 by the reading stand-by units 22a, 22b under the control of the feed system 24. In the reading unit 16, the stimulable phosphor sheet IP is fed in an auxiliary scanning direction in a state in which it is being nipped by the nip rollers 38a, 38b. During that period, the stimulable phosphor sheet IP is exposed to the laser beam L emitted from the optical unit 40 along a main scanning direction. As a result, accelerated light emitted from the stimulable phosphor sheet IP is introduced via the optical guide 42 into the photomultiplier 44, where the light is converted into an electric signal. The electric signal is stored in a memory as radiation image information of the object M. Alternatively, the electric signal is transferred to an image output device other than the memory as needed.

On the other hand, the stimulable phosphor sheet IP from which the image information has been read, is fed to the erasing unit 18 under the control of the feed system 24. Thereafter, the remaining radiation image information is erased from the stimulable phosphor sheet IP with the erasing light emitted from the erasing light source 46. Then, the stimulable phosphor sheet IP is fed to either the radiation-photography stand-by unit 20a or 20b so as to be placed on a following radiation-photography waiting state.

A description will now be made of a radiation-photographing process of the second recording unit 14B.

First, parts such as the hand and legs of the object M to be radiographed are placed on the radiation-photography table 32, and the radiation source 12 is then disposed over the entire areas of the parts to be radiographed. Thereafter, a stimulable phosphor sheet IP set in the radiation-photography stand-by unit 20b is allowed to pass through the first recording unit 14A so as to be accommodated in the holding unit 34 of the radiation-photography table 32 by the nip rollers 36.

In this condition, the object M is irradiated with the radiation emitted from the radiation source 12 to produce a radiation-transmitted image. Then, the radiation-transmitted image thus produced is stored and recorded on the stimulable phosphor sheet IP. The stimulable phosphor sheet IP with the radiation-transmitted image recorded thereon is moved to the first recording unit 14A again by the nip rollers 36, followed by transfer to the reading unit 16 via the reading stand-by units 22a, 22b under the control of the feed system 24. Thereafter, a radiation-transmitted image reading and erasing process is carried out in the same manner as described above. In this case, the second recording unit 14B is not provided with the scattered-radiation removing grid 28. Thus, a desired image can be obtained in high resolution by a relatively low dose of radiation.

As described above, the first recording unit 14A for making radiographs of the thick-sectional parts of the object M and the second recording unit 14B for making radiographs of the thin-sectional parts of the object M are provided in the present embodiment. It is therefore possible to make radiographs of various parts of the object M by a single radiation image information recording and reading apparatus 10.

Figure 3:
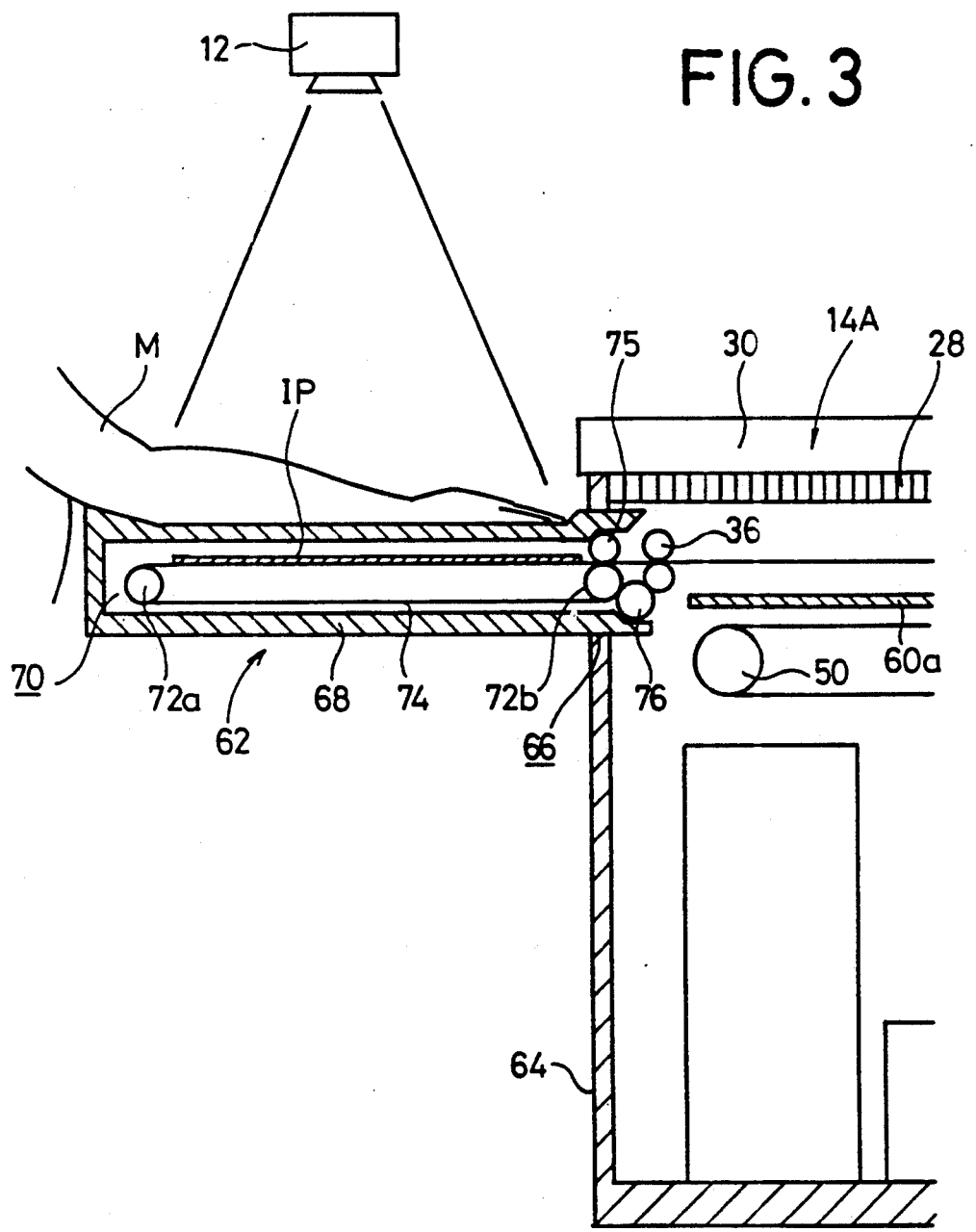
FIG. 3 is a cross-sectional view depicting the structure of another example of the second recording unit of the apparatus shown in FIG. 1.

FIG. 3 shows another example of a recording unit for making radiographs of the limb bones of the object M. A second recording unit 62 shown in FIG. 3 has a rectangular radiation-photography table 68 serving as a casing, which is detachably fitted in a hole 66 defined in one side portion of a casing 64 used to accommodate the first recording unit 14A, the reading unit 16, the erasing unit 18, etc. therein. A storage chamber 70 of the radiation-photography table 68 communicates with the first recording unit 14A when the second recording unit 62 is loaded in the casing 64. A belt 74 is tautly trained around a pair of pulleys 72a, 72b in the storage chamber 70. A roller 75, which is operable with the pulley 72b so as to prevent external light from entering into the storage chamber 70 and serves as a cover, is disposed on the pulley 72b on the first recording unit 14A side. A roller 76 for making sliding contact with a pair of nip rollers 36 in the casing 64 when the second recording unit 62 is loaded in the casing 64 and transmitting a driving force of the nip rollers 36 to the pulley 72b, is slidably held in engagement with the pulley 72b. As an alternative to the roller 76, the driving force may be transmitted to the pulley 72b by means of a gear.

The second recording unit 62 constructed as described above is mounted on the side portion of the casing 64. The driving force of the nip rollers 36 is then transmitted to the pulley 72b when the roller 76 is held in sliding contact with the pulley 72b, thereby enabling the belt 74 to be moved in a desired direction. Thus, the stimulable phosphor sheet IP is fed to a given position in the second recording unit 62. Thereafter, the radiation photography of the object M is made. When its radiation-photography is completed, the belt 74 is moved in the direction opposite to the above direction so as to introduce the stimulable phosphor sheet IP into the casing 64.

Figure 4:
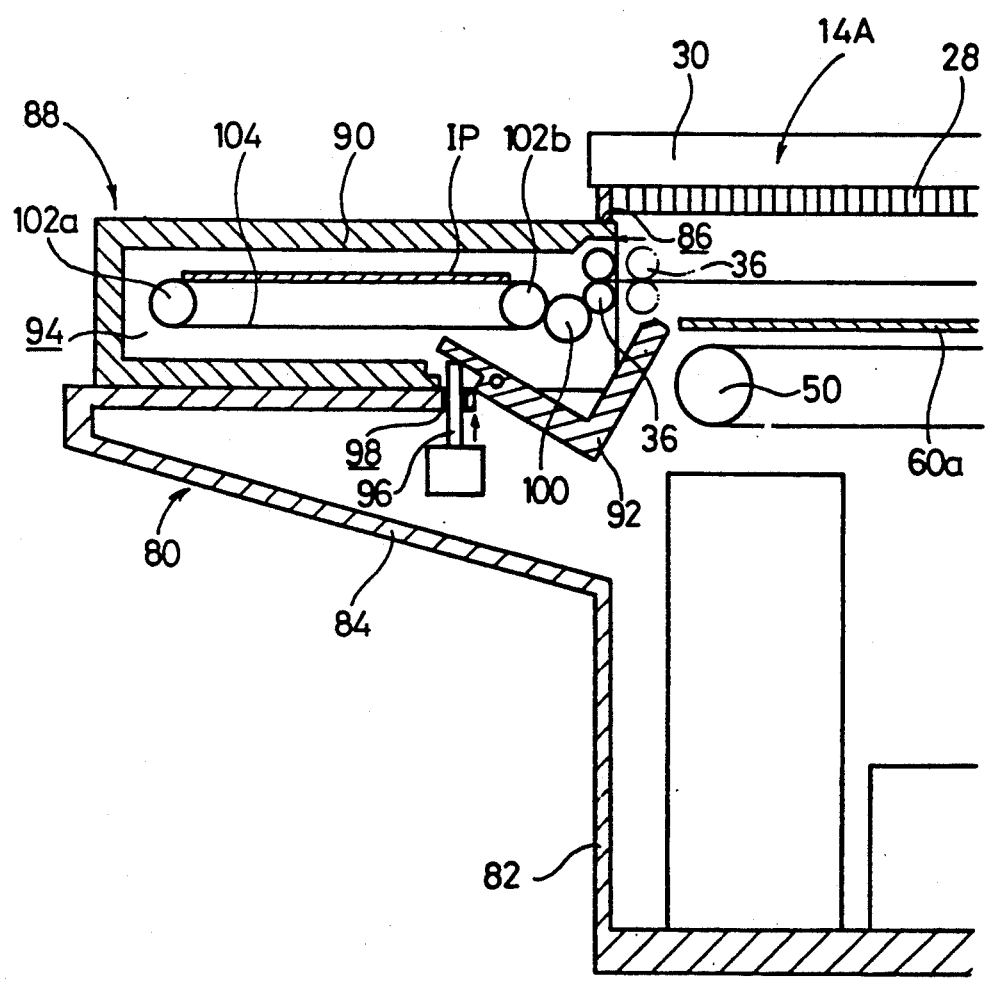
FIG. 4 is a cross-sectional view showing the structure of a further example of the second recording unit of the apparatus depicted in FIG. 1.

On the other hand, the second recording unit 62 can be loaded and unloaded in and from the casing 64 in the present embodiment. Therefore, the degree of freedom can be brought to the posture of the object M to be radiographed when the second recording unit 62 is unloaded from the casing 64 and the radiation photography of the object M is made after the stimulable phosphor sheet IP has been fed into the storage chamber 70 of the second recording unit 62. In this case, the pulley 72b and the roller 75 mounted in an aperture of the radiation-photography table 68 exhibit a light-intransmissive or screening function. Thus, the external light can reliably be prevented from entering into the storage chamber 70, thereby making it possible to provide suitable radiation photography. After the radiation photography of the object M has been completed, the second recording unit 62 is loaded in the casing 64 again. In this condition, the stimulable phosphor sheet IP is introduced into the casing 64 in the same manner as described above and then fed to the reading unit 16 (see FIG. 1), thereby reading an image. FIG. 4 shows a further example of the recording unit for making radiographs of the limb bones of the object M. A second recording unit 80 shown in the same drawing has a table 84 protrudently formed in one side portion of a casing 82 used to accommodate the first recording unit 14A, the reading unit 16, the erasing unit 18, etc. therein. A cassette 88 brought into engagement with a hole 86 defined in the casing 82 is placed on the upper portion of the table 84. The cassette 88 has a cover 92 mounted on an end of a casing 90 and activated in such a manner as to hold a storage chamber 94 of the casing 90 light-tight.

When the cassette 88 is brought into engagement with the hole 86 of the casing 82, a solenoid or the like is energized to upwardly move a pin 96 mounted on the table 84 so as to be inserted into a hole 98 defined in the casing 90, thereby opening the cover 92 (see FIG. 4). Then, when a pair of nip rollers 36 in the recording unit 14A is moved in the direction indicated by the arrow, they are brought into sliding contact with a roller 100, so that a driving force of the nip rollers 36 is transmitted to a belt 104 by pulleys 102a, 102b. As a result, a stimulable phosphor sheet IP is inserted and held in the cassette 88 by the nip rollers 36. The cassette 88 with the stimulable phosphor sheet IP stored therein can be used even when parts of an object M to be radiographed are placed on the cassette 88 and desired radiation photography of the parts is made. However, the cassette 88 unloaded from the casing 82 can also be employed in the radiation photography using another method. Since the cover 92 is closed when the cassette 88 is unloaded from the casing 82, the storage chamber 94 is held light-tight.

According to the radiation image information recording and reading apparatus of the present invention, the second recording unit free of the scattered-radiation removing grid is disposed adjacent to the first recording unit having the scattered-radiation removing grid. Therefore, a single radiation image information recording and reading apparatus can select either one of the first and second recording units according to parts to be radiographed and make a radiograph of a desired part of an object M. It is therefore possible to easily reduce the cost borne by a user and avoid an increase in space required to install the apparatus.

Having now fully described the invention, it will be apparent to those skilled in the art that many changes and modifications can be made without departing from the spirit or scope of the invention as set forth herein.

What is claimed is:

1. A radiation image information recording and reading apparatus comprising:
    first recording means for storing and recording radiation image information of an object on a stimulable phosphor sheet disposed via a scattered-radiation removing grid;
    second recording means placed side by side with said first recording means, for recording radiation image information of an object on a stimulable phosphor sheet;
    reading means for reading accelerated light obtained by irradiating the stimulable phosphor sheet with stimulating rays and generating an image signal corresponding to the radiation image information of the object from the read accelerated light;
    erasing means for radiating the energy of the remaining radiation from the stimulable phosphor sheet from which the radiation image information has been read; and
    a feed system for cyclically feeding the stimulable phosphor sheet among said first and second recording means, said reading means and said erasing means.

2. A radiation image information recording and reading apparatus according to claim 1, wherein said first recording means is provided so as to extend along a lower surface of a radiation-photography table for supporting the object thereon in a recumbent state.

3. A radiation image information recording and reading apparatus according to claim 1, wherein said second recording means is provided along an imaginary extension line of a feed path of said first recording means.

4. A radiation image information recording and reading apparatus according to claim 3, wherein said second recording means is mounted on a radiation-photography table which projects from one of both side portions of said first recording means.

5. A radiation image information recording and reading apparatus according to claim 3, wherein said second recording means is detachably mounted on said one side portion of said first recording means.

6. A radiation image information recording and reading apparatus according to claim 5, wherein said second recording means has feed means for conveying the stimulable phosphor sheet from one to another between said first recording means and said second recording means.

7. A radiation image information recording and reading apparatus according to claim 5, wherein light-screening means opened and closed according to the loading of the said second recording means in said one side portion and unloading of the same therefrom is disposed between said first recording means and said second recording means.

8. A radiation image information recording and reading apparatus according to claim 6, wherein transmitting means for connecting a feed system in said first recording means to said feed means of said second recording means thereby to transmit a driving force of said feed system to said feed means is disposed between said first recording means and said second recording means.

9. A radiation image information recording and reading apparatus according to claim 1, wherein said reading means includes laser scanning means for scanning the stimulable phosphor sheet with a laser beam and photoelectric transducing means for converting accelerated light emitted from said stimulable phosphor sheet into an electric signal.

10. A radiation image information recording and reading apparatus according to claim 1, wherein said erasing means has an erasing light source for irradiating the stimulable phosphor sheet with erasing light.

* * * * *